2,900,381

SEPARATION OF HMX FROM RDX

Donald Nixon Thatcher, Sewell, N.J., assignor to E. I. du Pont de Nemours and Company, Wilmington, Del., a corporation of Delaware No Drawing. Application April 12, 1957
Serial No. 652,351

3 Claims. (Cl. 260—239)

The present invention relates to a process for the separation of chemical compounds. More specifically, the present invention relates to a process for the separation of cyclotetramethylenetetranitramine (HMX) from its mixtures with cyclotrimethylenetrinitramine (RDX).

Cyclotetramethylenetetranitramine usually is prepared by the nitrolysis of hexamethylenetetratramine by nitric acid and ammonium nitrate in the presence of acetic anhydride. However, the cyclotetramethylenetetranitramine prepared by this method is contaminated with a substantial proportion of cyclotrimethylenetrinitramine, and, for use as a thermally stable explosive compound, cyclotetramethylenetetranitramine containing little or no cyclotrimethylenetrinitramine as an impurity is desirable. Cyclotrimethylenetrinitramine in pure form also is desired for use as an explosive compound. However, heretofore, separation of cyclotetramethylenetetranitramine-cyclotrimethylenetrinitramine mixtures without destruction of one of the compounds has been difficult because the physical properties of these homologous compounds are similar. For example, they both have similarly low solubilities in most of the common organic solvents, e.g., acetone. Thus, a simple, economical process whereby these two valuable explosive compounds might be separated is needed.

Accordingly, an object of the present invention is a simple process for the separation of cyclotetramethylenetetranitramine of high purity from its mixtures with cyclotrimethylenetrinitramine. Another object of the present invention is a simple process for the separation of cyclotetramethylenetetranitramine of a desirable crystal form and density from cyclotetramethylenetetranitramine mixtures with cyclotrimethylenetrinitramine. A further object of the present invention is a simple process for the separation of cyclotetramethylenetetranitramine from cyclotetramethylenetetranitramine - cyclotrimethylenetrinitramine mixtures without destruction of the cyclotrimethylenetrinitramine. Other objects will become apparent as the invention is further described.

I have found that the foregoing objects may be achieved by dissolving cyclotetramethylenetetranitramine mixtures with cyclotrimethylenetrinitramine in dimethyl sulfoxide and thereafter adding water to the resulting solution.

In accordance with the process of the invention, cyclotetramethylenetetranitramine of high purity and of a desirable crystal form and density is obtained from a cyclotetramethylenetetranitramine - cyclotrimethylenetrinitramine mixture when the mixture is dissolved in dimethyl sulfoxide, and water then is added in an amount sufficient to initiate precipitation of the cyclotetramethylenetetranitramine, the temperature of the solution during the process being below the boiling point of every component of the system.

The following examples illustrate specific embodiments of the method of carrying out the process of the invention. However, they should not be construed as limiting the invention in any manner. The parts in the examples are parts by weight.

*Example 1*

A sample (265.7 parts) of a mixture of cyclotetramethylenetetranitramine and cyclotrimethylenetrinitramine containing 60–80% cyclotetramethylenetetranitramine was added to 660 parts of dimethylsulfoxide, and the mixture was heated to 90° C. All of the mixture went into solution. Water (90 parts) then was added to the solution until the cloud point was reached, and the mixture was reheated until the solution became clear. The solution, while being stirred, was cooled rapidly to room temperature. The solid material (156 parts) which separated was filtered from the solution and was washed with water. The melting point of the dried solid was 267.5° C. The filtrate was heated to 90° C. and water (90 parts) then was added to precipitate a second crop of cyclotetramethylenetetranitramine. In a like manner, a third and fourth crop were precipitated. The purity of the cyclotetramethylenetetranitramine of the first crop was greater than 95%. After three recrystallizations from dimethyl sulfoxide, the melting point of this cyclotetramethylenetetranitramine was 280.8° C. Infrared analysis indicated a cyclotetramethylenetetranitramine purity of greater than 99 mole percent. The cyclotrimethylenetrinitramine was not destroyed by the separation process, and each subsequent crop became richer in cyclotrimethylenetrinitramine. The density of the cyclotetramethylenetetranitramine obtained was from 1.89 to 1.91 g./cc., and the cyclotetramethylenetetranitramine was not sensitive to impact.

*Example 2*

The procedure of Example 1 was followed except that 76 parts of a cyclotetramethylenetetranitramine mixture containing approximately 75% cyclotetramethylenetetranitramine was dissolved in 165 parts of dimethylsulfoxide heated to 50° C. and the resulting solution was not reheated after the addition of water. Cyclotetramethylenetetranitramine of greater than 98% purity in the amount of 50.7 parts was obtained in the first crop.

As the foregoing examples illustrate, cyclotetramethylenetetranitramine of high purity is obtained from cyclotetramethylenetetranitramine - cyclotrimethylenetrinitramine mixtures without destruction of the cyclotrimethylenetrinitramine. The examples also show that the cyclotetramethylenetetranitramine recovered has a high density. High densities are desirable in many applications of explosives.

Cyclotetramethylenetetranitramine exists in four different crystal forms, three of which are very sensitive to impact. Cyclotetramethylenetetranitramine obtained according to the process of the invention has the crystal form which is the least sensitive to impact and, therefore, is the safest to handle.

The process of the invention can be effected at any temperature below the boiling point of every component of the system for obvious reasons. Temperatures as low as, for example, room temperature, are suitable for dissolving the cyclotetramethylenetetranitramine-cyclotrimethylenetrinitramine mixtures in the dimethyl sulfoxide. However, because the amount of solvent required is dependent on the temperature employed, greater economies may be gained by using temperatures somewhat above room temperature. Hence, as is illustrated in the examples, I prefer to effect solution of the cyclotetramethylenetetranitramine-cyclotrimethylenetrinitramine mixtures at a temperature within the range of about 70 to about 90° C.

I also have shown that, following the addition of the water in the present process, the resulting solution may be heated prior to effecting crystallization. However, as is indicated in Example 2, this feature is not critical in the process and, for efficiency purposes, elimination of this step may be desirable.

The weight ratio of dimethyl sulfoxide to cyclotetramethylenetetranitramine - cyclotrimethylenetrinitramine mixture in the runs of the examples is approximately 2 to 1. However, the weight ratio of dimethyl sulfoxide to cyclotetramethylenetetranitramine mixture is not critical, the amount of dimethyl sulfoxide needed being dependent on the amount of cyclotetramethylenetetranitramine-cyclotrimethylenetrinitramine mixture used, the temperature at which solution is effected, and like factors generally. Also, the more dimethyl sulfoxide that is used, the more water is needed to precipitate the cyclotetramethylenetetranitramine. For ease of handling and economy, the preferred weight ratio of dimethyl sulfoxide to cyclotetramethylenetetranitramine-cyclotrimethylenetrinitramine mixture is between 2 to 1 and 4 to 1.

The amount of water required in the present process is that amount necessary to initiate precipitation of the cyclotetramethylenetetranitramine at the temperature employed. As is indicated in the examples, this amount is readily determined by observing the point at which clouding of the solution begins.

While I have illustrated the process by the separation of cyclotetramethylenetetranitramine-cyclotrimethylenetrinitramine mixtures containing 60–80% cyclotetramethylenetetranitramine, cyclotetramethylenetetranitramine from mixtures containing between 30 and 95% cyclotetramethylenetetranitramine may be separated equally well by the present process.

The present invention has been described in detail in the foregoing. However, it will be apparent that many variations may be introduced without departure from the scope of the invention. I intend, therefore, to be limited only by the following claims.

I claim:

1. In the process for the separation of cyclotetramethylenetetranitramine from its mixtures with cyclotrimethylenetrinitramine, the improvement which comprises dissolving a mixture of cyclotetramethylenetetranitramine and cyclotrimethylenetrinitramine in dimethyl sulfoxide at a temperature between about 70 and about 90° C. and thereafter adding water in an amount sufficient to initiate the precipitation of said cyclotetramethylenetetranitramine in a crystalline form characterized by low sensitivity to impact.

2. The process as claimed in claim 1 wherein the weight ratio of said dimethyl sulfoxide to said mixture of cyclotetramethylenetetranitramine and cyclotrimethylenetrinitramine is between about 2:1 and about 4:1.

3. In the process for the separation of cyclotetramethylenetetranitramine from its mixtures with cyclotrimethylenetrinitramine, the improvement which comprises dissolving a mixture of cyclotetramethylenetetranitramine and cyclotrimethylenetrinitramine in dimethyl sulfoxide at a temperature between about 70 and about 90° C., adding water in an amount sufficient to initiate precipitation of said cyclotetramethylenetetranitramine in the crystalline form characterized by low sensitivity to impact and thereafter separating said solid cyclotetramethylenetetranitramine from the remaining liquid.

References Cited in the file of this patent

UNITED STATES PATENTS

| 2,365,898 | Morris et al. | Dec. 26, 1944 |
| 2,439,648 | Burtle et al. | Apr. 13, 1948 |
| 2,535,350 | Crater | Dec. 26, 1950 |
| 2,656,355 | Bachmann | Oct. 20, 1953 |

FOREIGN PATENTS

| 615,419 | Great Britain | Jan. 6, 1949 |

UNITED STATES PATENT OFFICE
CERTIFICATE OF CORRECTION

August 18, 1959

Patent No. 2,900,381

Donald Nixon Thatcher

It is hereby certified that error appears in the printed specification of the above numbered patent requiring correction and that the said Letters Patent should read as corrected below.

Column 1, line 21, for "hexamethylenetetratramine" read -- hexamethylenetetramine --.

Signed and sealed this 16th day of February 1960.

(SEAL)
Attest:

KARL H. AXLINE
Attesting Officer

ROBERT C. WATSON
Commissioner of Patents